US007633735B2

(12) United States Patent
Urakawa

(10) Patent No.: US 7,633,735 B2
(45) Date of Patent: Dec. 15, 2009

(54) ESD PROTECTION DEVICE

(75) Inventor: Jun Urakawa, Oumihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/274,391

(22) Filed: Nov. 20, 2008

(65) Prior Publication Data

US 2009/0067113 A1 Mar. 12, 2009

Related U.S. Application Data

(63) Continuation of application No. PCT/JP2008/054132, filed on Mar. 7, 2008.

(30) Foreign Application Priority Data

May 28, 2007 (JP) ............................ 2007-141142

(51) Int. Cl.
*H02H 9/00* (2006.01)

(52) U.S. Cl. ........................................ 361/112; 361/56

(58) Field of Classification Search ................. 361/112, 361/56
See application file for complete search history.

(56) References Cited

U.S. PATENT DOCUMENTS 6,608,547 B1 * 8/2003 Greier et al. .................. 338/21

FOREIGN PATENT DOCUMENTS

| | | | |
|---|---|---|---|
| JP | 02-46680 | A | 2/1990 |
| JP | 08-236260 | A | 9/1996 |
| JP | 2000-173743 | A | 6/2000 |
| JP | 2001-043954 | A | 2/2001 |
| JP | 2003-297524 | A | 10/2003 |

OTHER PUBLICATIONS

Official Communication issued in International Patent Application No. PCT/JP2008/054132, mailed on May 27, 2008.

* cited by examiner

*Primary Examiner*—Stephen W Jackson
(74) *Attorney, Agent, or Firm*—Keating and Bennett, LLP

(57) ABSTRACT

An ESD protection device includes a ceramic multilayer board, a cavity disposed in the ceramic multilayer board, at least one pair of discharge electrodes having ends, edges of the ends being opposed to each other at a predetermined distance in the cavity, and external electrodes disposed on outer surfaces the ceramic multilayer board and connected to the discharge electrodes. The ceramic multilayer board includes a composite portion, which is disposed in the vicinity of the surface on which the discharge electrodes are disposed and is at least disposed adjacent to the opposed ends of the discharge electrodes and to a space between the opposed ends. The composite portion includes a metal material and a ceramic material.

12 Claims, 7 Drawing Sheets

ESD PROTECTION DEVICE

BACKGROUND OF THE INVENTION

1. Field of the Invention

The present invention relates to an electrostatic discharge (ESD) protection device and more particularly, to a technique for preventing a fracture caused by cracking and the deformation of a ceramic multilayer board in an ESD protection device that includes opposed discharge electrodes in a cavity of the ceramic multilayer board.

2. Description of the Related Art

ESD is a phenomenon in which a charged electroconductive body (for example, the human body) comes into contact with or comes into close proximity to another electroconductive body (for example, an electronic device) and discharges electricity. ESD causes damage or malfunctioning of electronic devices. To prevent ESD, it is necessary to protect circuits of the electronic devices from an excessively high discharge voltage. ESD protection devices, which are also known as surge absorbers, have been used.

An ESD protection device may be disposed between a signal line and ground. The ESD protection device includes a pair of opposed discharge electrodes and has a high resistance under normal operation. Thus, typically, a signal is not sent to the ground. An excessively high voltage generated by static electricity, for example, through an antenna of a mobile phone causes discharge between the discharge electrodes of the ESD protection device, which discharges the static electricity to the ground. Thus, the ESD device can protect circuits disposed downstream thereof from the static electricity.

An ESD protection device illustrated in an exploded perspective view of FIG. 13 and a cross-sectional view of FIG. 14 includes opposed discharge electrodes 6 in a cavity 5 of a ceramic multilayer board 7 made of insulating ceramic sheets 2. The discharge electrodes 6 are connected to external electrodes 1. The cavity 5 includes a discharge gas. Application of a breakdown voltage between the discharge electrodes 6 causes discharge between the discharge electrodes 6 in the cavity 5, discharging an excessively high voltage to the ground. Thus, the ESD protection device protects circuits disposed downstream thereof from the static electricity (see, for example, Japanese Unexamined Patent Application Publication No. 2001-43954).

However, such an ESD protection device has the following problems.

First, the discharge starting voltage depends primarily on the distance between discharge electrodes. However, the distance between the discharge electrodes may vary due to lot-to-lot variations or differences in shrinkage between a ceramic multilayer board and the discharge electrodes during a firing process. This produces variations in the discharge starting voltage of an ESD protection device. It is therefore difficult to precisely set the discharge starting voltage.

Second, the discharge electrodes disposed in a cavity may be detached from a ceramic multilayer board due to a reduced airtightness of the cavity or different thermal expansion coefficients between the substrate layers of the ceramic multilayer board and the discharge electrodes. This deteriorates the function of an ESD protection device, or alters the discharge starting voltage, which reduces the reliability of the ESD protection device.

SUMMARY OF THE INVENTION

To overcome the problems described above, preferred embodiments of the present invention provide a reliable ESD protection device having a precise discharge starting voltage.

An ESD protection device according to a preferred embodiment of the present invention includes a ceramic multilayer board, a cavity disposed in the ceramic multilayer board, at least one pair of discharge electrodes having ends that oppose each other, the ends being opposed to each other at a predetermined distance in the cavity, and external electrodes disposed on outer surfaces of the ceramic multilayer board and connected to the discharge electrodes. The ceramic multilayer board includes a composite portion including a metallic material and a ceramic material, the composite portion being disposed in the vicinity of the surface on which the discharge electrodes are disposed and at least being disposed adjacent to the opposed ends of the discharge electrodes and to adjacent to a space between the opposed ends.

In the ESD protection device described above, the composite portion is preferably disposed between the ceramic multilayer board and the opposed ends of the discharge electrodes. The composite portion preferably includes a metallic material and a ceramic material. The metallic material preferably has a firing shrinkage substantially the same as the firing shrinkage of the opposed ends of the discharge electrodes. The ceramic material preferably has a firing shrinkage substantially the same as the firing shrinkage of the ceramic multilayer board. Thus, the firing shrinkage of the composite portion can preferably be between the firing shrinkage of the opposed ends of the discharge electrodes and the firing shrinkage of the ceramic multilayer board. The composite portion can therefore reduce the difference in firing shrinkage between the ceramic multilayer board and the opposed ends of the discharge electrodes. This reduces defects, for example, caused by the detachment of a discharge electrode in a firing process or caused by characteristic variations. The composite portion can also reduce variations in the distance between the opposed ends of the discharge electrodes, and thereby, reduce variations in the discharge starting voltage.

The composite portion can preferably have a thermal expansion coefficient that is between the thermal expansion coefficient of the opposed ends of the discharge electrodes and the thermal expansion coefficient of the ceramic multilayer board. The composite portion can therefore reduce the difference in thermal expansion coefficient between the ceramic multilayer board and the opposed ends of the discharge electrodes. This reduces defects, for example, caused by the detachment of a discharge electrode or caused by characteristic changes over time.

Since the composite portion including the metallic material is adjacent to the opposed ends of the discharge electrodes, the metallic material can be changed in order to set the discharge starting voltage at a desired voltage. Thus, the discharge starting voltage can be set more precisely than the discharge starting voltage that is adjusted only by changing the distance between the opposed ends of the discharge electrodes.

Preferably, the composite portion is disposed only adjacent to the opposed ends and the space between the opposed ends.

Since the metallic material is not provided outside the region that is adjacent to the opposed ends of the discharge electrodes and to the space between the opposed ends, the electrical characteristics, such as the dielectric constant, and the mechanical strength of the substrate layers outside the region, are not adversely affected by the metallic material.

Preferably, the composite portion is disposed on a side of the cavity and has a width that is less than that of the cavity, when viewed from the above of the ESD protection device.

With this configuration, the composite portion disposed directly under the cavity can reduce variations in the distance between the opposed ends of the discharge electrodes. Thus, the discharge starting voltage can be precisely set.

Preferably, the ceramic material of the composite portion is substantially the same as the ceramic material of at least one layer in the ceramic multilayer board.

With this configuration, the difference in shrinkage or thermal expansion coefficient between the composite portion and the ceramic multilayer board can be easily reduced. This ensures the prevention of defects, such as the detachment of a discharge electrode.

Preferably, the content of the metallic material in the composite portion ranges from about 10% to about 50% by volume, for example.

The composite portion including at least about 10% by volume of metallic material has a shrinkage starting temperature between the shrinkage starting temperature of the opposed ends of the discharge electrodes and the shrinkage starting temperature of the ceramic multilayer board during firing. Furthermore, about 50% by volume or less of metallic material in the composite portion does not cause a short circuit between the opposed ends of the discharge electrodes.

Preferably, the discharge electrodes are spaced apart from the side surfaces of the ceramic multilayer board. The ESD protection device preferably further includes internal electrodes disposed in the ceramic multilayer board and on a plane that is different from a plane on which the discharge electrodes are disposed, the internal electrodes extending from side surfaces of the ceramic multilayer board and being connected to the external electrodes and via electrodes that connect the discharge electrodes to the internal electrodes in the ceramic multilayer board.

With this configuration, since the discharge electrodes are not connected to the external electrodes on a single plane, moisture penetration from outside the ESD protection device can be reduced. This improves the resistance to environmental deterioration of the ESD protection device.

Preferably, a first discharge electrode of a pair of the discharge electrodes is connected to a ground, and a second discharge electrode of the discharge electrodes is connected to a circuit. The end of the first discharge electrode opposing that of the second discharge electrode has a larger width than the end of the second discharge electrode.

In this case, the second discharge electrode connected to a circuit can easily discharge electricity toward the first discharge electrode connected to a ground. This ensures the protection of the circuit against fracture.

Preferably, a first discharge electrode of a pair of the discharge electrodes is connected to a ground, and a second discharge electrode of the discharge electrodes is connected to a circuit. The end of the second discharge electrode is relatively sharp.

The sharp end of the second discharge electrode connected to a circuit can easily discharge electricity. This ensures the protection of the circuit against fracture.

Preferably, one of the external electrodes connected to the first discharge electrode connected to a ground has an electrode area that is greater than that of the other of the external electrodes connected to the second discharge electrode connected to a circuit.

This reduces the connection resistance to the ground, and thus, facilitates discharge.

Preferably, a plurality of pairs of the discharge electrodes is disposed in the lamination direction of the ceramic multilayer board.

With this configuration, since a pair of opposed discharge electrodes define a single element, the ESD protection device includes a plurality of elements. The ESD protection device can therefore be used for a plurality of circuits. This reduces the number of ESD protection devices in an electronic device and enables downsizing of a circuit in the electronic device.

Preferably, the ceramic multilayer board is a non-shrinkage board in which shrinkage control layers and substrate layers are alternately stacked.

The use of the non-shrinkage ceramic multilayer board improves the precision with which the distance is set between the opposed ends of the discharge electrodes, and thereby, reduces variations in characteristics, such as the discharge starting voltage.

In an ESD protection device according to various preferred embodiments of the present invention, a composite portion reduces the difference in firing shrinkage and thermal expansion coefficient after firing between a ceramic multilayer board and opposed ends of discharge electrodes. Thus, the discharge starting voltage can be precisely set. The ESD protection device is therefore highly reliable.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described below with reference to FIGS. 1 to 12.

First Preferred Embodiment

Figure 1:
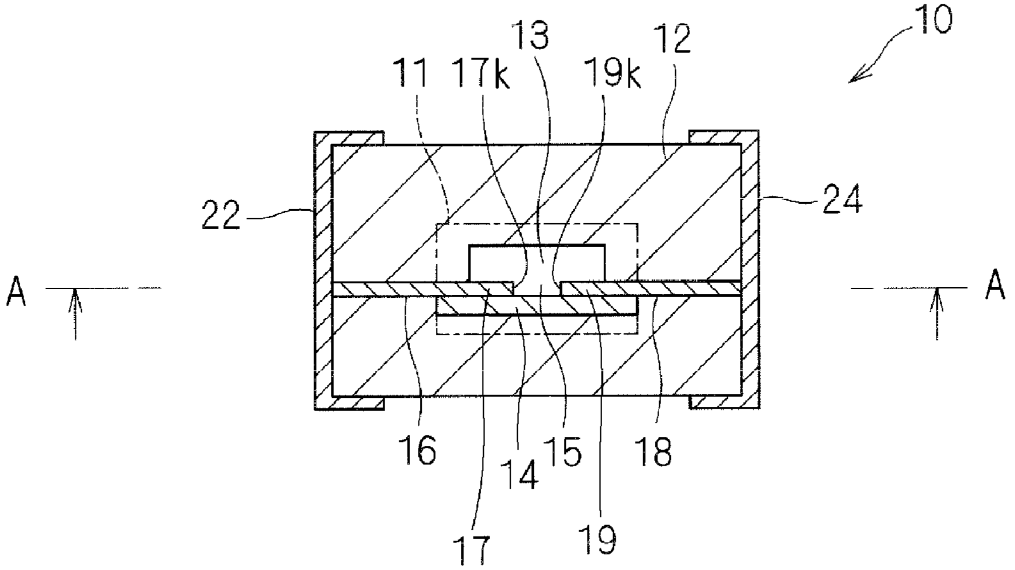
FIG. 1 is a cross-sectional view of an ESD protection device according to a first preferred embodiment of the present invention.
Figure 2:
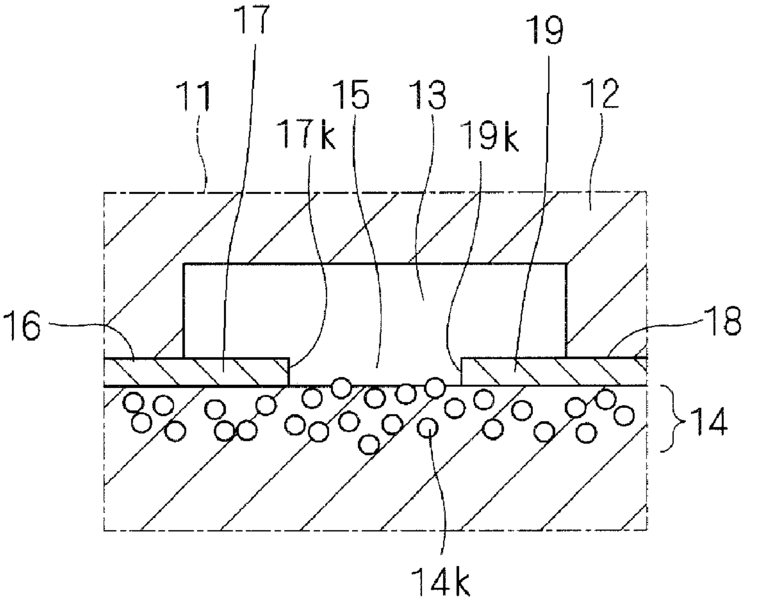
FIG. 2 is an enlarged cross-sectional view of a principal portion of the ESD protection device shown in FIG. 1.
Figure 3:
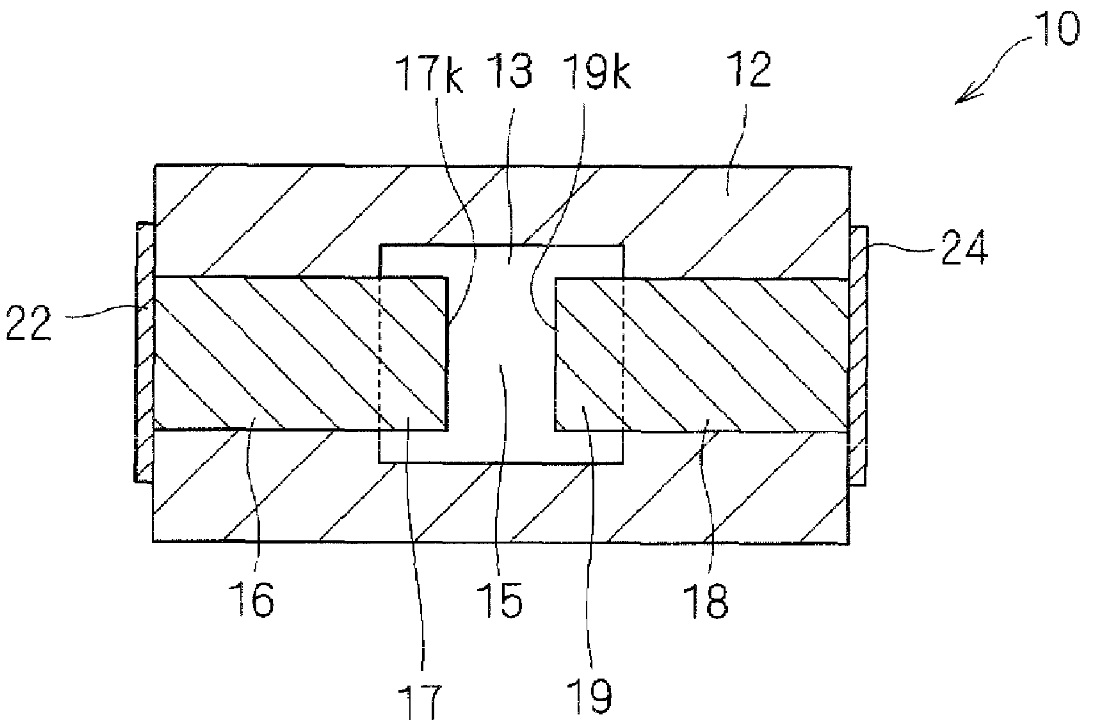
FIG. 3 is a cross-sectional view taken along line A-A in FIG. 1.

An ESD protection device 10 according to a first preferred embodiment will be described below with reference to FIGS. 1 to 3. FIG. 1 is a cross-sectional view of the ESD protection device 10. FIG. 2 is a schematic enlarged cross-sectional view of a principal portion of a region 11 indicated by a chain line in FIG. 1. FIG. 3 is a cross-sectional view taken along line A-A in FIG. 1.

As illustrated in FIG. 1, the ESD protection device 10 includes a ceramic multilayer board 12 having a cavity 13. Opposed ends 17 and 19 of discharge electrodes 16 and 18 are disposed in the cavity 13. The discharge electrodes 16 and 18 extend to side surfaces of the ceramic multilayer board 12 and are connected to external electrodes 22 and 24 disposed on an outer surface of the ceramic multilayer board 12. The external electrodes 22 and 24 are arranged to mount the ESD protection device 10.

As illustrated in FIG. 3, the ends 17 and 19 of the discharge electrodes 16 and 18 are opposed to each other at a predetermined distance 15. When a voltage greater than a predetermined voltage is applied to the discharge electrodes 16 and 18 via the external electrodes 22 and 24, discharge occurs between the opposed ends 17 and 19.

As illustrated in FIG. 1, a composite portion 14 is disposed adjacent to the opposed ends 17 and 19 of the discharge electrodes 16 and 18 and adjacent to a space between the opposed ends 17 and 19. The composite portion 14 is in contact with the opposed ends 17 and 19 of the discharge electrodes 16 and 18 and the ceramic multilayer board 12. As illustrated in FIG. 2, the composite portion 14 includes particles of metal material **14*k*** dispersed in a ceramic substrate.

The material of the ceramic substrate in the composite portion 14 may be substantially the same as or different from the ceramic material of the ceramic multilayer board 12. When these ceramic materials are substantially the same, the ceramic substrate has substantially the same shrinkage as the ceramic multilayer board 12, and the number of materials used can be reduced. The metal material **14*k* of the composite portion 14 may be substantially the same as or different from the material of the discharge electrodes 16 and 18. When the materials are substantially the same, the metal material 14*k* has substantially the same shrinkage as the discharge electrodes 16 and 18**, and the number of materials used can be reduced.

Since the composite portion 14 includes the metal material **14*k* and the ceramic substrate, the composite portion 14 has a firing shrinkage between the firing shrinkage of the discharge electrodes 16 and 18 and the firing shrinkage of the ceramic multilayer board 12. Thus, the composite portion 14 reduces the difference in the firing shrinkage between the ceramic multilayer board 12 and the opposed ends 17 and 19 of the discharge electrodes 16 and 18. This reduces defects, for example, caused by the detachment of the opposed ends 17 and 19 of the discharge electrodes 16 and 18 or characteristic variations. The composite portion 14 also reduces variations in the distance 15 between the opposed ends 17 and 19 of the discharge electrodes 16 and 18**, and thereby, reduces variations in the characteristics, such as the discharge starting voltage.

The composite portion 14 can also preferably have a thermal expansion coefficient between the thermal expansion coefficient of the discharge electrodes 16 and 18 and the thermal expansion coefficient of the ceramic multilayer board 12. Therefore the composite portion 14 can reduce the difference in the thermal expansion coefficient between the ceramic multilayer board 12 and that of the opposed ends 17 and 19 of the discharge electrodes 16 and 18. This reduces defects, for example, caused by the detachment of the opposed ends 17 and 19 of the discharge electrodes 16 and 18 or characteristic changes over time.

The metal material **14*k* in the composite portion 14 can preferably be changed in order to set the discharge starting voltage at a desired voltage. Thus, the discharge starting voltage can be set more precisely than the discharge starting voltage that is adjusted only by changing the distance 15 between the opposed ends 17 and 19 of the discharge electrodes 16 and 18**.

The manufacture of the ESD protection device 10 will be described below.

(1) Preparation of Materials

The ceramic material was primarily made of Ba, Al, and Si. These components were mixed at a predetermined ratio and were calcined at a temperature in the range of about 800° C. to about 1000° C. The calcined powder was pulverized into a ceramic powder in a zirconia ball mill for about 12 hours. The ceramic powder was mixed with an organic solvent, such as toluene or EKINEN (trade name), for example. The resulting mixture was further mixed with a binder and a plasticizer to prepare a slurry. The slurry was formed into ceramic green sheets by a doctor blade method. The ceramic green sheets had a thickness of about 50 μm.

An electrode paste was prepared by mixing about 80% by weight Cu power having an average particle size of about 2 μm, an ethyl cellulose-based binder resin, and a solvent in a three-roll mill.

The Cu powder and the ceramic powder at a predetermined ratio, a binder resin, and a solvent were mixed in the same manner as in the preparation of the electrode paste, thus yielding a ceramic-metal mixed paste. The binder resin and the solvent defined about 20% by weight of the mixed paste, and the Cu powder and the ceramic powder define about 80% by weight of the mixed paste.

Mixed pastes of the Cu powder and the ceramic powder at volume ratios shown in Table 1 were prepared.

TABLE 1

| | Volume ratio (% by volume) | |
|---|---|---|
| Paste No. | Ceramic powder | Cu powder |
| 1 | 100 | 0 |
| 2 | 95 | 5 |
| 3 | 90 | 10 |
| 4 | 80 | 20 |
| 5 | 70 | 30 |
| 6 | 50 | 50 |
| 7 | 40 | 60 |
| 8 | 0 | 100 |

A resin paste made of a resin, which can be eliminated by firing, and a solvent is also prepared in substantially the same manner. Examples of the resin include PET, polypropylene, ethyl cellulose, and an acrylic resin.

(2) Application of Mixed Material, Electrode, and Resin Pastes by Screen Printing To form a composite portion 14 on one of the ceramic green sheets, the ceramic-metal mixed paste is applied to the ceramic green sheet at a thickness in the range of about 2 μm to about 100 μm in a predetermined pattern by screen printing, for example. When the ceramic-metal mixed paste is applied with a large thickness, the ceramic-metal mixed paste may be charged into a preformed hollow in the ceramic green sheet.

The electrode paste is then applied to the ceramic-metal mixed paste to form discharge electrodes 16 and 18 having a discharge gap between opposed ends 17 and 19 thereof. The width of the discharge electrodes 16 and 18 was about 100 μm, and the discharge gap width (distance between the opposed ends 17 and 19) was about 30 μm. The resin paste is then applied to the electrode paste to form a cavity 13.

(3) Lamination and Pressing

As with conventional ceramic multilayer boards, the ceramic green sheets are pressed together. The laminate had a thickness of about 0.3 mm and included the opposed ends 17 and 19 of the discharge electrodes 16 and 18 and the cavity 13 in the approximate center thereof.

(4) Cutting and Application of External Electrodes

As with chip-type electronic components, such as LC filters, for example, the laminate was cut into about 1.0 mm×about 0.5 mm chips with a microcutter. The electrode paste was then applied to side surfaces of each chip to form external electrodes 22 and 24.

material, such as a mixture of forsterite and glass or a mixture of $CaZrO_3$ and glass, for example. The electrode material is not limited to Cu and may be Ag, Pd, Pt, Al, Ni, W or a combination thereof, for example. The ceramic-metal mixed material is not limited to paste and may be in the form of a sheet.

While the resin paste is used to form the cavity 13, any material that can be eliminated by firing, such as carbon, for example, may be used. Furthermore, instead of applying the paste by screen printing, a resin film may be disposed at a predetermined location, for example.

One hundred of the ESD protection devices 10 thus prepared were examined for the presence of a short circuit between the discharge electrodes 16 and 18, a break after firing, and delamination through by observing cross sections thereof.

The shrinkage starting temperatures of the pastes were compared. More specifically, to examine the shrinkage of the pastes, each paste was dried to form a powder. The powder was pressed to form a sheet having a thickness of about 3 mm, which was subjected to thermomechanical analysis (TMA). The shrinkage starting temperature of the ceramic powder was about 885° C., which was substantially the same as that of the paste No. 1.

The ESD sensitivity of the ESD protection devices 10 was determined by an electrostatic discharge immunity test in conformity with an IEC standard IEC 61000-4-2. The test was performed at a voltage of about 8 kV in a contact discharge mode.

Table 2 shows the evaluation results, together with the properties of the ceramic-metal mixed pastes.

TABLE 2

| Sample No. | Volume ratio (% by volume) Ceramic powder | Cu powder | Shrinkage starting temperature of paste (° C.) | Short (%) | Break (%) | Delamination | ESD sensitivity |
|---|---|---|---|---|---|---|---|
| 1* | 100 | 0 | 885 | 10 | 6 | Observed | Observed |
| 2 | 95 | 5 | 880 | 4 | 1 | None | Observed |
| 3 | 88 | 10 | 840 | 0 | 0 | None | Observed |
| 4 | 80 | 20 | 820 | 0 | 0 | None | Observed |
| 5 | 70 | 30 | 810 | 0 | 0 | None | Observed |
| 6 | 50 | 50 | 780 | 0 | 0 | None | Observed |
| 7 | 40 | 60 | 745 | 25 | 0 | None | — |
| 8* | 0 | 100 | 680 | 100 | 5 | Observed | — |

*outside the scope of the present invention (5) Firing

As with conventional ceramic multilayer boards, the chips are fired in a $N_2$ atmosphere. When a rare gas, such as Ar or Ne, is introduced into the cavity 13 to reduce the response voltage to the ESD, the chips may preferably be fired in an atmosphere of the rare gas in a temperature range in which the ceramic powder sinters. Electrode material resistant to oxidation (for example, Ag) may be fired in the air.

(6) Plating

As with chip-type electronic components, such as LC filters, for example, the external electrodes are coated with Ni—Sn by electroplating, for example.

Through these processes, the ESD protection device 10 illustrated in FIGS. 1 and 2 was manufactured.

The ceramic material is not limited to the material described above and may be any suitable insulating ceramic When the metal content in the ceramic-metal mixed paste is less than about 5% by volume (paste No. 1), the shrinkage starting temperature of the paste is substantially the same as that of the ceramic powder and is about 200° C. greater than the shrinkage starting temperature of about 680° C. of the electrode (paste No. 8). Thus, the sample No. 1 has a short circuit and a break after firing. The observation of the inside showed the delamination of a discharge electrode.

When the metal content in the ceramic-metal mixed paste is at least about 10% by volume, the shrinkage starting temperature of the paste approaches that of the electrode and is between that of the electrode and that of the ceramic powder. The samples had no short circuit, no break, no detachment of the electrodes, and no delamination. The ESD sensitivity is not affected by the ceramic-metal mixed paste and is outstanding. Variations in discharge gap width were also very small.

When the metal content in the ceramic-metal mixed paste is at least about 60% by volume, metal particles in the mixed paste come into contact with each other, which causes a short circuit after firing.

Samples No. 3 to No. 6, which include about 10% to about 50% by volume of metal in the ceramic-metal mixed paste, do not have these defects. More preferably, the metal content ranges from about 30% to about 50% by volume. To summarize, the content of metal material 14*k* in the composite portion 14 preferably ranges from about 10% to about 50% by volume, for example, and more preferably ranges from about 30% to about 50% by volume, for example.

Thus, the composite of the electrode component and the ceramic material has a shrinkage between the shrinkage of the electrode material and the shrinkage of the ceramic material. The composite portion disposed between the discharge electrodes and the ceramic layer and at the discharge gap reduced the stress generated between the ceramic multilayer board and the discharge electrodes. This prevents a break in the discharge electrodes, the delamination of a discharge electrode, a short circuit caused by detachment of a discharge electrode in the cavity, and variations in discharge gap width caused by variations in shrinkage of the discharge electrodes.

Second Preferred Embodiment

An ESD protection device 10*a* according to a second preferred embodiment will be described below with reference to FIG. 4. The ESD protection device 10*a* according to the second preferred embodiment has a structure that is similar to that of the ESD protection device 10 according to the first preferred embodiment. Thus, points of difference will primarily be described below. Like reference numerals denote like components.

Figure 4:
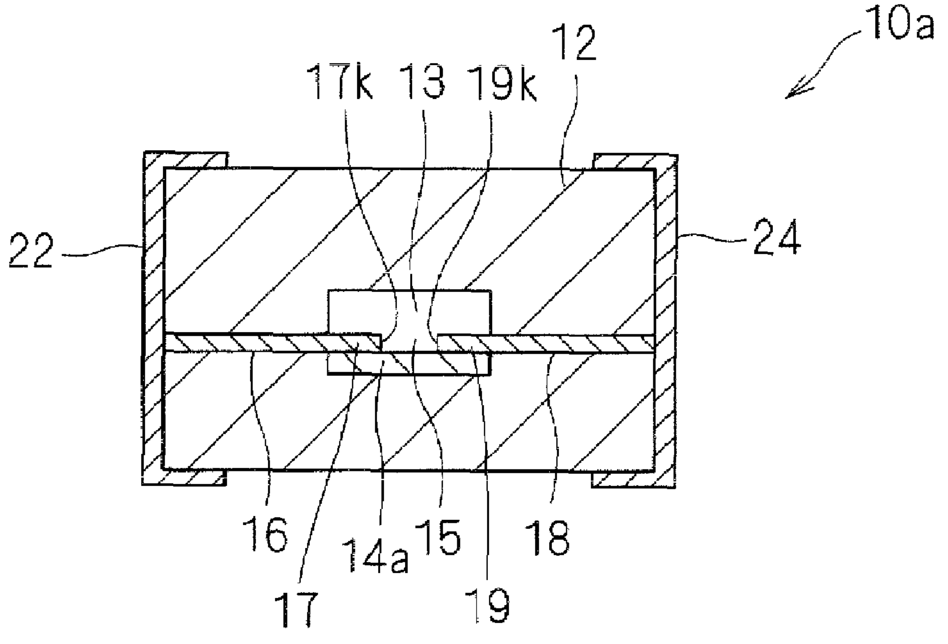
FIG. 4 is a cross-sectional view of an ESD protection device according to a second preferred embodiment of the present invention.

FIG. 4 is a cross-sectional view of the ESD protection device 10*a* substantially perpendicular to the discharge electrodes 16 and 18, as in FIG. 1. As illustrated in FIG. 4, a composite portion 14*a* is disposed directly under a cavity 13. In other words, the composite portion 14*a* is disposed on a side of the cavity 13 and has a width that is less than that of the cavity 13, when viewed from above the ESD protection device 10*a* (in the vertical direction).

The composite portion 14*a* disposed directly under the cavity 13 reduces variations in the shape of the cavity 13. This reduces variations in the distance 15 between opposed ends 17 and 19 of the discharge electrodes 16 and 18. Thus, the discharge starting voltage can be set precisely.

Third Preferred Embodiment

An ESD protection device 10*b* according to a third preferred embodiment will be described below with reference to FIG. 5. The ESD protection device 10*b* according to the third preferred embodiment has a structure that is similar to those of the ESD protection devices according to the first and second preferred embodiments. Thus, points of difference will primarily be described below. Like reference numerals denote like components.

Figure 5:
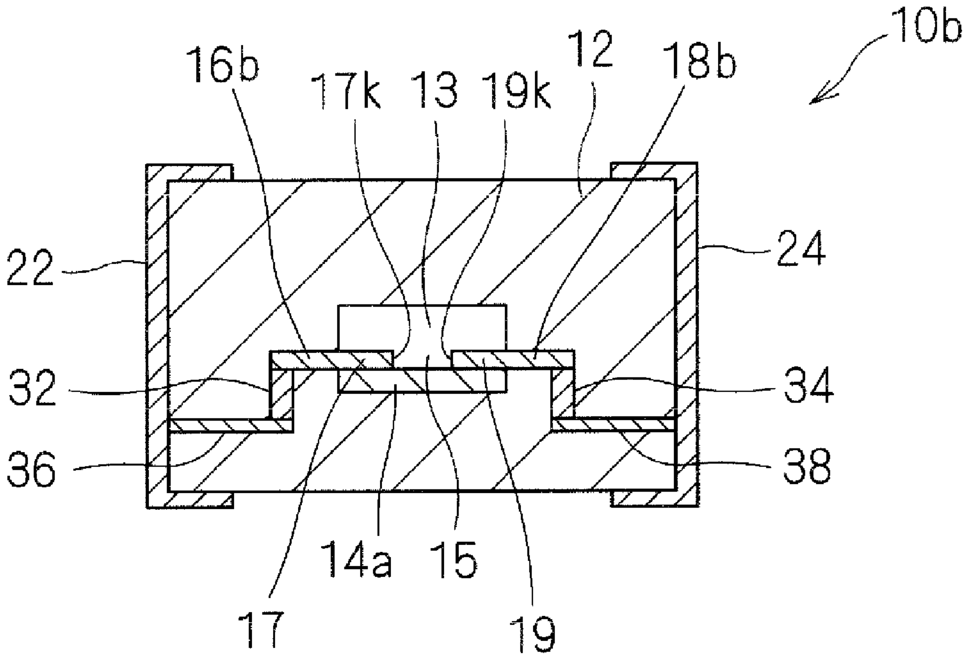
FIG. 5 is a cross-sectional view of an ESD protection device according to a third preferred embodiment of the present invention.

FIG. 5 is a cross-sectional view of the ESD protection device 10*b* substantially perpendicular to the discharge electrodes 16*b* and 18*b*. As illustrated in FIG. 5, the ESD protection device 10*b* includes the discharge electrodes 16*b* and 18*b* disposed in a central portion of a ceramic multilayer board 12, internal electrodes 36 and 38 disposed on a plane that is different from a plane on which the discharge electrodes 16*b* and 18*b* are disposed, and via electrodes 32 and 34 disposed between the discharge electrodes 16*b* and 18*b* and the internal electrodes 36 and 38, passing through at least one layer of the ceramic multilayer board 12. The discharge electrodes 16*b* and 18*b* are electrically connected to external electrodes 22 and 24 through the via electrodes 32 and 34 and the internal electrodes 36 and 38.

Since the discharge electrodes 16*b* and 18*b* are not connected to the external electrodes 22 and 24 on a single plane, moisture penetration from the outside is reduced. Thus, the ESD protection device 10*b* according to the third preferred embodiment has improved resistance to environmental deterioration.

Fourth Preferred Embodiment

An ESD protection device 10*c* according to a fourth preferred embodiment will be described below with reference to FIG. 6. The ESD protection device 10*c* according to the fourth preferred embodiment has a structure that is similar to those of the ESD protection devices according to the first to third preferred embodiments. Thus, points of difference will primarily be described below. Like reference numerals denote like components.

Figure 6:
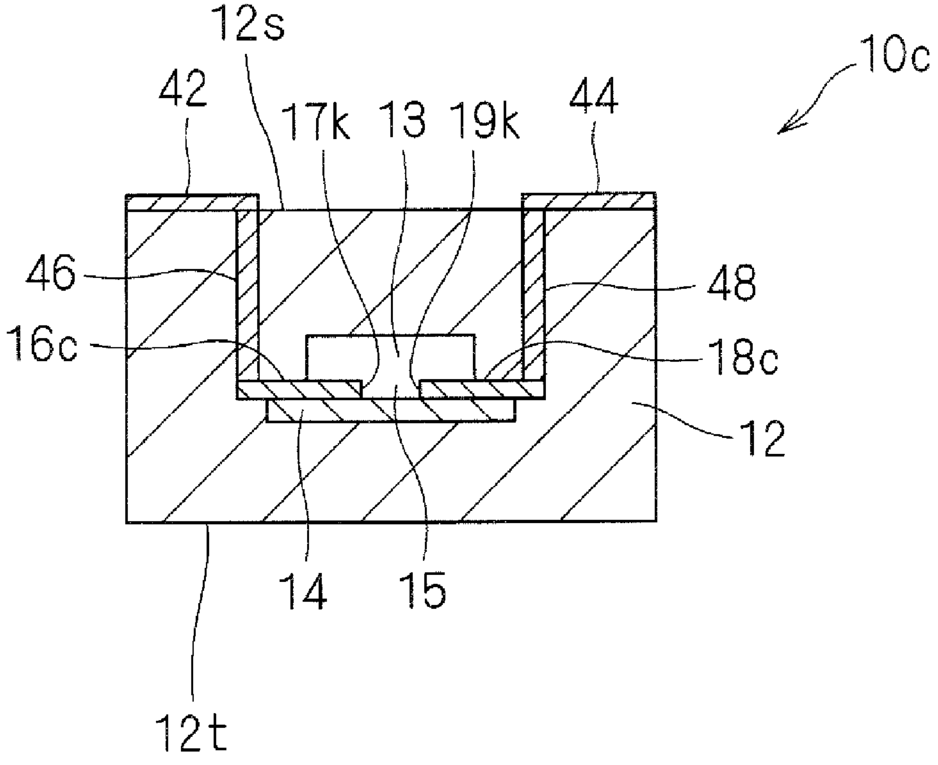
FIG. 6 is a cross-sectional view of an ESD protection device according to a fourth preferred embodiment of the present invention.

FIG. 6 is a cross-sectional view of the ESD protection device 10*c* substantially perpendicular to the discharge electrodes 16*c* and 18*c*. As illustrated in FIG. 6, the ESD protection device 10*c* includes the discharge electrodes 16*c* and 18*c* disposed in the central portion of a ceramic multilayer board 12, external electrodes 42 and 44 disposed on a top surface 12*s* of the ceramic multilayer board 12, and via electrodes 46 and 48 disposed between the discharge electrodes 16*c* and 18*c* and the external electrodes 42 and 44. The discharge electrodes 16*c* and 18*c* are electrically connected to the external electrodes 42 and 44 through the via electrodes 46 and 48.

The external electrodes 42 and 44 are connected to electrodes of a circuit board (not shown) by wire bonding.

While a composite portion 14 is wider than a cavity 13 in FIG. 6, the composite portion 14 may be disposed only directly under the cavity 13, as in the composite portion 14*a* according to the third preferred embodiment. The external electrodes 42 and 44 may be disposed on the bottom surface 12*t* of the ceramic multilayer board 12, instead of the top surface 12*s*.

Fifth Preferred Embodiment

An ESD protection device 10*d* according to a fifth preferred embodiment will be described below with reference to FIG. 7. The ESD protection device 10*d* according to a fifth preferred embodiment has a structure that is similar to those of the ESD protection devices according to the first to third preferred embodiments. Thus, points of difference will primarily be described below. Like reference numerals denote like components.

Figure 7:
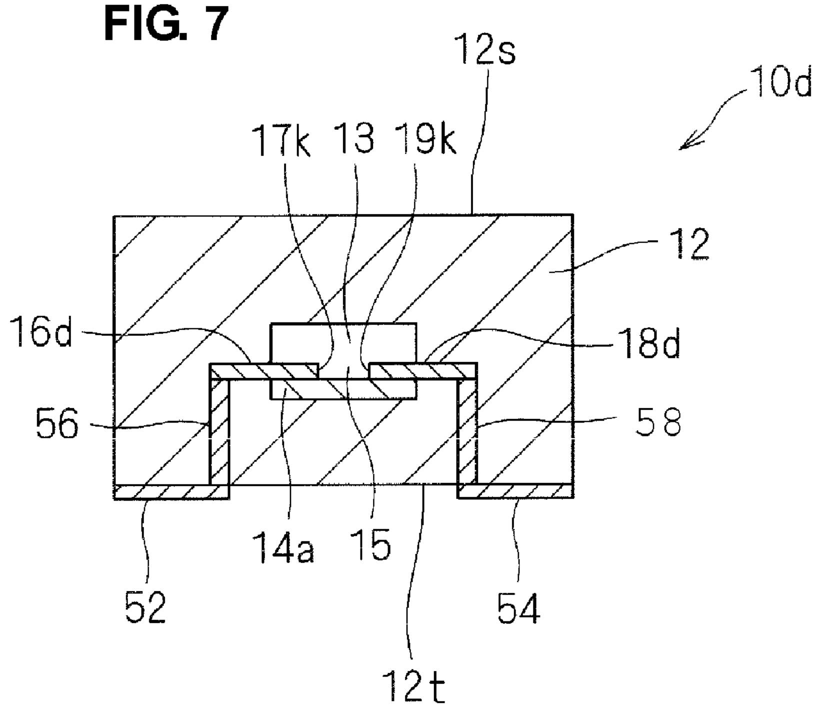
FIG. 7 is a cross-sectional view of an ESD protection device according to a fifth preferred embodiment of the present invention.

FIG. 7 is a cross-sectional view of the ESD protection device 10*d* substantially perpendicular to the discharge electrodes 16*d* and 18*d*. As illustrated in FIG. 7, the ESD protection device 10*d* includes the discharge electrodes 16*d* and 18*d* disposed in the central portion of a ceramic multilayer board 12, external electrodes 52 and 54 disposed on the bottom surface 12*t* of the ceramic multilayer board 12, and via electrodes 56 and 58 disposed between the discharge electrodes 16*d* and 18*d* and the external electrodes 52 and 54. The discharge electrodes 16*d* and 18*d* are electrically connected to the external electrodes 52 and 54 through the via electrodes 56 and 58.

The external electrodes 52 and 54 are connected to electrodes of a circuit board (not shown) with solder or bumps.

While a composite portion 14*a* is disposed directly under a cavity 13 in FIG. 7, the composite portion 14*a* may be wider than the cavity 13, as in the composite portion 14 according to the first preferred embodiment. The external electrodes 52 and 54 may be disposed on the top surface 12*s* of the ceramic multilayer board 12 instead of the bottom surface 12*t*.

Sixth Preferred Embodiment

An ESD protection device 10*x* according to a sixth preferred embodiment will be described below with reference to FIG. 8.

Figure 8:
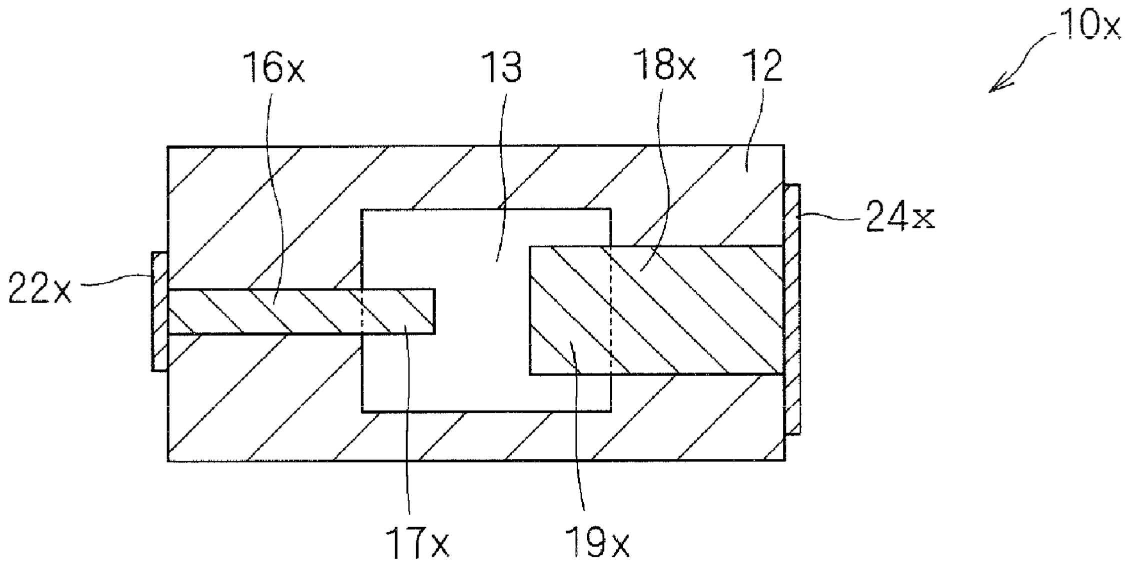
FIG. 8 is a cross-sectional view of an ESD protection device according to a sixth preferred embodiment of the present invention.

FIG. 8 is a cross-sectional view of the ESD protection device 10*x* substantially parallel to the discharge electrodes 16*x* and 18*x*, as in FIG. 3. As illustrated in FIG. 8, an end 19*x* of a first discharge electrode 18*x* in a cavity 13 is wider than an end 17*x* of a second discharge electrode 16*x* opposing the end 19*x* in the cavity 13. The first discharge electrode 18*x* is connected to a ground through an external electrode 24*x*. The second discharge electrode 16*x* is connected to a circuit (not shown), which is protected from static electricity, through an external electrode 22*x*. The external electrode 24*x* connected to the ground has a greater electrode area than that of the external electrode 22*x* connected to the circuit.

Since the width of the end 17*x* of the second discharge electrode 16*x* is less than the width of the end 19*x* of the first discharge electrode 18*x*, the second discharge electrode 16*x* connected to the circuit can easily discharge electricity toward the first discharge electrode 18*x* connected to the ground. In addition, the larger external electrode 24*x* connected to the ground reduces the connection resistance to the ground, thus facilitating discharge. Therefore, the ESD protection device 10*x* reliably protects the circuit against fracture.

Seventh Preferred Embodiment

An ESD protection device 10*y* according to a seventh preferred embodiment will be described below with reference to FIG. 9.

Figure 9:
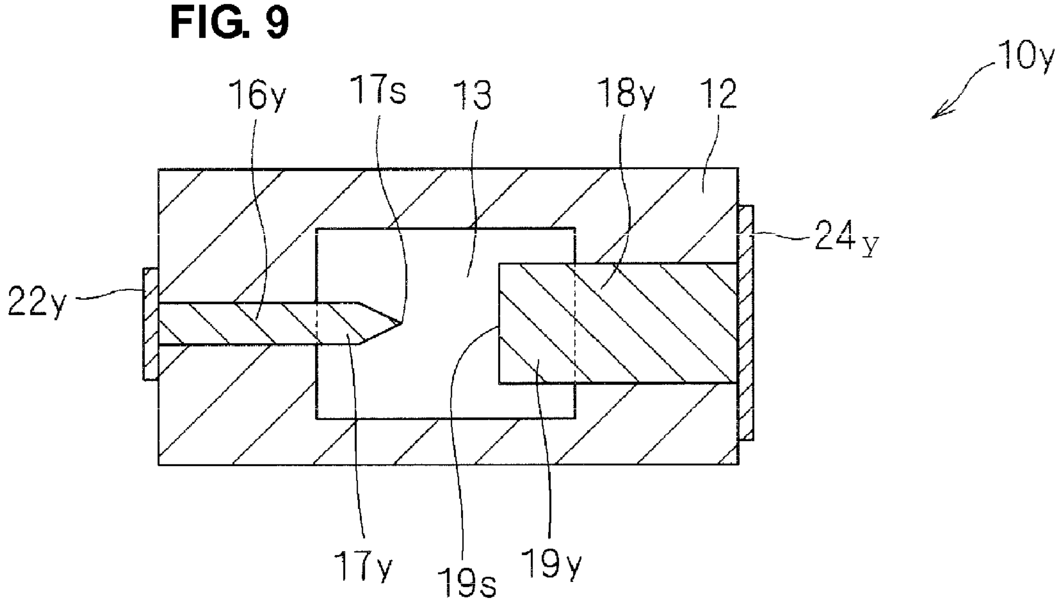
FIG. 9 is a cross-sectional view of an ESD protection device according to a seventh preferred embodiment of the present invention.

FIG. 9 is a cross-sectional view of the ESD protection device 10*y* substantially parallel to discharge electrodes 16*y* and 18*y*. As illustrated in FIG. 9, an end 19*y* of a first discharge electrode 18*y* in a cavity 13 has a flat edge 19*s*, and an end 17*y* of a second discharge electrode 16*y* opposing the end 19*y* in the cavity 13 has a sharp edge 17*s*. The first discharge electrode 18*y* is connected to a ground through an external electrode 24*y*. The second discharge electrode 16*y* is connected to a circuit (not shown), which is protected from static electricity, through an external electrode 22*y*.

The sharp edge 17*s* of the end 17*y* of the second discharge electrode 16*y* facilitates discharge. Thus, the ESD protection device 10*y* reliably protects the circuit against fracture.

Eighth Preferred Embodiment

An ESD protection device 10*z* according to an eighth preferred embodiment will be described below with reference to FIG. 10.

Figure 10:
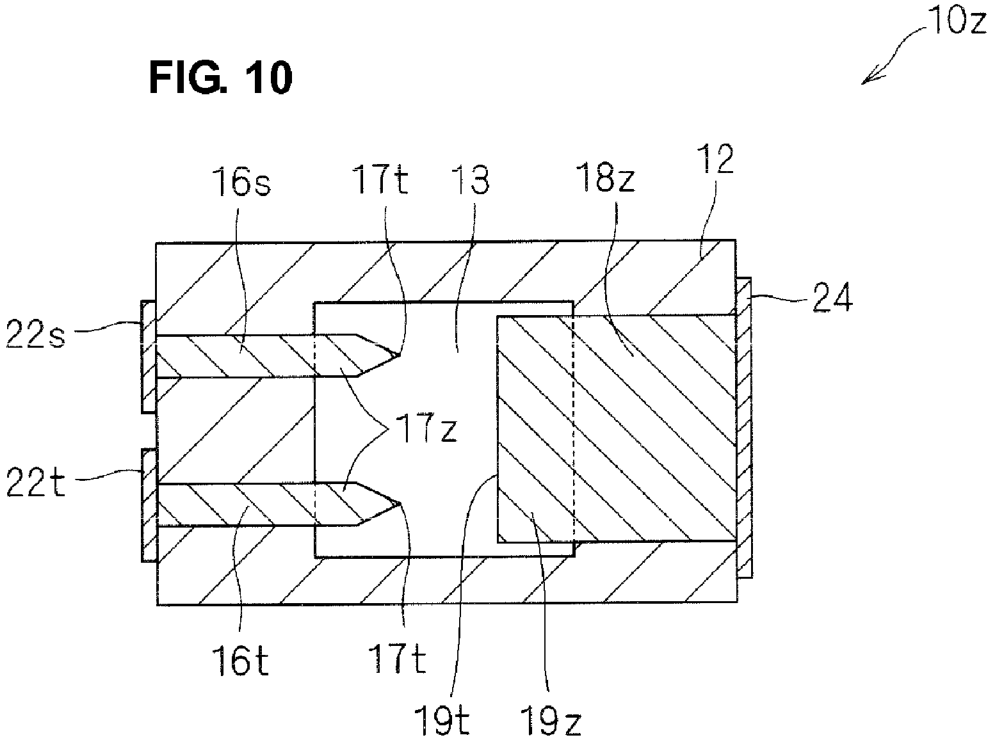
FIG. 10 is a cross-sectional view of an ESD protection device according to an eighth preferred embodiment of the present invention.

FIG. 10 is a cross-sectional view of the ESD protection device 10*z* substantially parallel to discharge electrodes 16*s*, 16*t*, and 18*z*. As illustrated in FIG. 10, a first and second discharge electrodes 16*s* and 16*t* and a third discharge electrode 18*z* define a pair. Opposed ends 17*z* and 19*z* of the electrodes are disposed in a cavity 13. The end 19*z* of the third discharge electrode 18*z* has a flat edge 19*t*, and the ends 17*z* of the first and second discharge electrodes 16*s* and 16*t* have sharp edges 17*t*. The third discharge electrode 18*z* is connected to a ground through an external electrode 24. The first and second discharge electrodes 16*s* and 16*t* are connected to a circuit through external electrodes 22*s* and 22*t*.

The sharp edges 17*t* of the ends 17*z* of the first and second discharge electrodes 16*s* and 16*t* facilitate discharge. Thus, the ESD protection device 10*z* reliably protect the circuit against fracture.

Since discharge occurs independently between the third discharge electrode 18*z* and the first discharge electrode 16*s* and between the third discharge electrode 18*z* and the second discharge electrode 16*t*, the first and second discharge electrodes 16*s* and 16*t* can be connected to different circuits. This reduces the number of ESD protection devices required in an electronic device and enable downsizing of a circuit in the electronic device.

Ninth Preferred Embodiment

An ESD protection device 100 according to a ninth preferred embodiment will be described below with reference to FIGS. 11 and 12.

Figure 11:
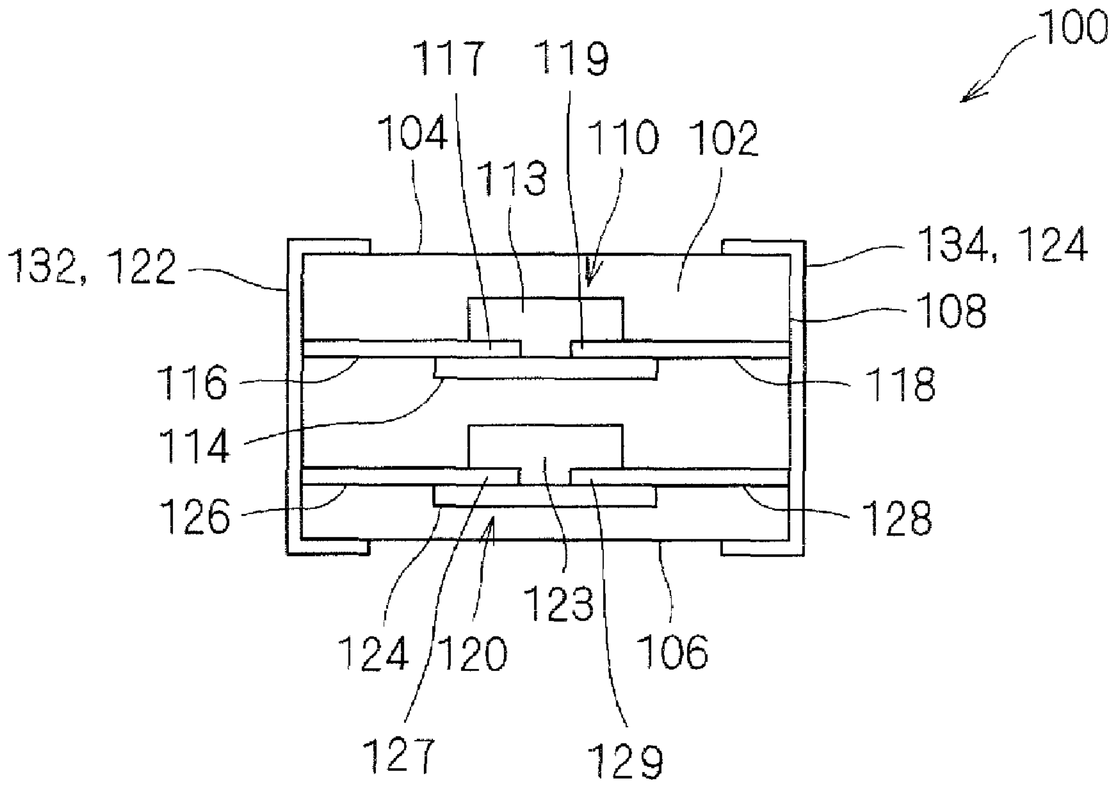
FIG. 11 is a perspective view of an ESD protection device according to a ninth preferred embodiment of the present invention.
Figure 12:
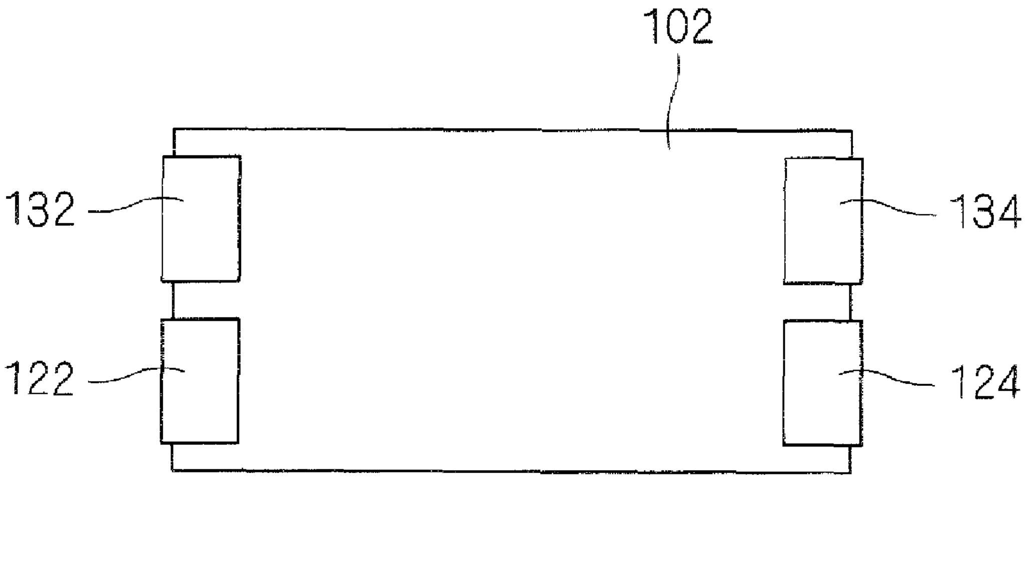
FIG. 12 is a top view of the ESD protection device shown in FIG. 11.
Figure 13:
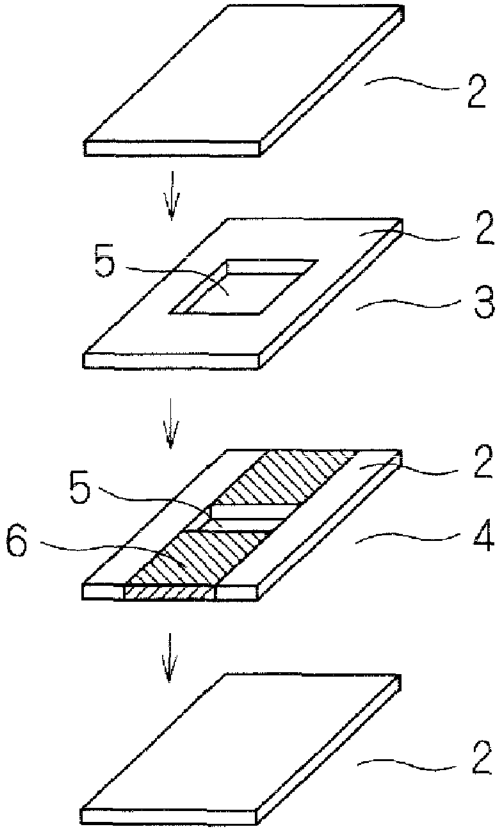
FIG. 13 PRIOR ART
FIG. 13 is an exploded perspective view of an ESD protection device of the related art.
Figure 14:
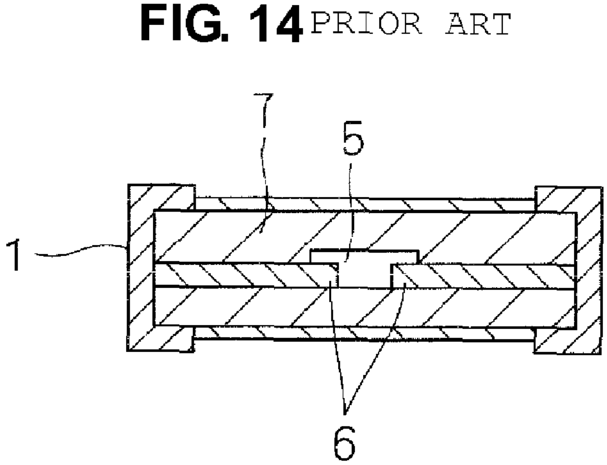
FIG. 14 PRIOR ART
FIG. 14 is a cross-sectional view of an ESD protection device of the related art.

FIG. 11 is a perspective view of the ESD protection device 100 substantially perpendicular to the discharge electrodes 116, 118, 126, and 128. FIG. 12 is a top view of the ESD protection device 100.

As illustrated in FIG. 11, the ESD protection device 100 includes two elements 110 and 120 in a ceramic multilayer board 102. As in the first preferred embodiment, the element 110 includes opposed ends 117 and 119 of the discharge electrodes 116 and 118 in a cavity 113, and a composite portion 114 adjacent to the opposed ends 117 and 119 and to a space between the opposed ends 117 and 119. The element 120 includes opposed ends 127 and 129 of the discharge electrodes 126 and 128 in a cavity 123, and a composite portion 124 adjacent to the opposed ends 127 and 129 and adjacent to the space between the opposed ends 127 and 129. The composite portions 114 and 124 are in contact with the ends 117, 119, 127, and 129 of the discharge electrodes 116, 118, 126, and 128 and the ceramic multilayer board 102. The discharge electrodes 116, 118, 126, and 128 are connected to external electrodes 122, 124, 132, and 134, respectively. As illustrated in FIG. 11, the discharge electrodes 116 and 118 of the element 110 and the discharge electrodes 126 and 128 of the element 120 are disposed in the lamination direction of the ceramic multilayer board 102.

The ESD protection device 100 including a plurality of elements 110 and 120 can be used for a plurality of circuits. This reduces the number of ESD protection devices required in an electronic device and enables downsizing of a circuit in the electronic device.

A non-shrinkage board in which shrinkage control layers and substrate layers are alternately stacked is preferably used as a ceramic multilayer board of an ESD protection device.

Each of the substrate layers is preferably made of at least one sintered ceramic sheet including a first ceramic material. The characteristics of the ceramic multilayer board depend on the characteristics of the substrate layers. Each of the shrinkage control layers is preferably made of at least one sintered ceramic sheet including a second ceramic material.

Preferably, each of the substrate layers has a thickness in the range of about 8 μm to about 100 μm, for example, after firing. While the thickness of the substrate layers after firing is not limited to this range, it is preferably equal to or less than the maximum thickness at which the constraint layers can constrain the substrate layers during firing. Each of the substrate layers may have different thicknesses.

A portion (for example, glass component) of the first ceramic material permeates the constraint layers during firing. Preferably, the first ceramic material is low temperature co-fired ceramic (LTCC) that can be fired at a relatively low temperature, for example, about 1050° C. or less so that the first ceramic material can be co-fired with a conductor pattern made of a low-melting point metal, such as silver or copper, for example. Specific examples of the first ceramic material include glass ceramic including alumina and borosilicate glass and Ba—Al—Si—O ceramic, which produce a glass component during firing.

The second ceramic material is fixed by a portion of the first ceramic material permeating from the substrate layers. Thus, the constraint layers are solidified and joined to adjacent substrate layers.

The second ceramic material may preferably be alumina or zirconia, for example. The green second ceramic material in the constraint layers preferably has a greater sintering temperature than that of the first ceramic material. Thus, the constraint layers reduce the in-plane shrinkage of the substrate layers in firing. As described above, the constraint layers are fixed and joined to adjacent substrate layers by a portion of the first ceramic material permeating from the substrate layers. Thus, although the thickness also depends on the substrate layers and the constraint layers, the desired constraining force, and the firing conditions, the thickness of the constraint layers after firing preferably ranges from about 1 μm to about 10 μm, for example.

The materials of the discharge electrodes, the internal electrodes, and the via electrodes may preferably primarily include an electroconductive component that can be co-fired with the substrate layers. The materials may be widely known materials. Specific examples of the materials include Cu, Ag, Ni, Pd, and oxides and alloys thereof.

As described above, a composite portion is disposed between a ceramic multilayer board and discharge electrodes and at a gap between opposed ends of the discharge electrodes. The composite portion includes a metallic material and a ceramic material and has a shrinkage between the shrinkage of the ceramic material and the shrinkage of the electrode material. The composite portion reduces the stress acting between the ceramic multilayer board and the discharge electrodes, breaks in the discharge electrodes, delamination of the discharge electrodes, detachment of the discharge electrodes in a cavity, variations in discharge gap width caused by variations in the shrinkage of the discharge electrodes, and short circuits.

This enables an ESD protection device to have a precise discharge starting voltage and high reliability.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An electrostatic discharge protection device comprising:

a ceramic multilayer board;

a cavity disposed in the ceramic multilayer board;

at least one pair of discharge electrodes having ends that oppose each other, the ends being opposed to each other at a predetermined distance in the cavity; and external electrodes disposed on outer surfaces of the ceramic multilayer board and connected to the discharge electrodes; wherein the ceramic multilayer board includes a composite portion including a metallic material and a ceramic material, the composite portion being disposed in the vicinity of a surface on which the discharge electrodes are disposed and at least being disposed adjacent to the opposed ends of the discharge electrodes and adjacent to a space between the opposed ends.

2. The electrostatic discharge protection device according to claim 1, wherein the composite portion is disposed only adjacent to the opposed ends and the space between the opposed ends.

3. The electrostatic discharge protection device according to claim 1, wherein the composite portion is disposed on a side of the cavity and has a width that is less than that of the cavity, when viewed from above the electrostatic discharge protection device.

4. The electrostatic discharge protection device according to claim 1, wherein the ceramic material of the composite portion is substantially the same as a ceramic material of at least one layer in the ceramic multilayer board.

5. The electrostatic discharge protection device according to claim 1, wherein the content of the metallic material in the composite portion ranges from about 10% to about 50% by volume.

6. The electrostatic discharge protection device according to claim 1, further comprising:

internal electrodes disposed in the ceramic multilayer board and on a plane that is different from a plane on which the discharge electrodes are disposed, the internal electrodes extending from side surfaces of the ceramic multilayer board and being connected to the external electrodes; and via electrodes that connect the discharge electrodes to the internal electrodes in the ceramic multilayer board; wherein the discharge electrodes are spaced apart from the side surfaces of the ceramic multilayer board.

7. The ESD protection device according to claim 1, wherein a first discharge electrode of one of the at least one pair of the discharge electrodes is connected to a ground, and a second discharge electrode of the one of the at least one pair discharge electrodes is connected to a circuit; and an end of the first discharge electrode opposing that of the second discharge electrode has a width that is greater than that of an end of the second discharge electrode.

8. The ESD protection device according to claim 1, wherein a first discharge electrode of one of the at least one pair of the discharge electrodes is connected to a ground, and a second discharge electrode of the one of the at least one pair of discharge electrodes is connected to a circuit; and an end of the second discharge electrode is sharp.

9. The ESD protection device according to claim 7, wherein one of the external electrodes connected to the first discharge electrode has an electrode area that is greater than that of the other of the external electrodes connected to the second discharge electrode.

10. The ESD protection device according to claim 8, wherein one of the external electrodes connected to the first discharge electrode has an electrode area that is greater than that of the other of the external electrodes connected to the second discharge electrode.

11. The ESD protection device according to claim 1, wherein a plurality of pairs of the discharge electrodes are disposed in the lamination direction of the ceramic multilayer board.

12. The ESD protection device according to claim 1, wherein the ceramic multilayer board is a non-shrinkage board in which shrinkage control layers and substrate layers are alternately stacked.

* * * * *